(12) United States Patent
Dabak et al.

(10) Patent No.: US 7,609,612 B2
(45) Date of Patent: Oct. 27, 2009

(54) MULTI-CARRIER TRANSMITTER FOR ULTRA-WIDEBAND (UWB) SYSTEMS

(75) Inventors: Anand G. Dabak, Plano, TX (US); Anuj Batra, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 780 days.

(21) Appl. No.: 10/335,610

(22) Filed: Jan. 2, 2003

(65) Prior Publication Data

US 2004/0008617 A1 Jan. 15, 2004

Related U.S. Application Data

(60) Provisional application No. 60/395,379, filed on Jul. 12, 2002.

(51) Int. Cl.
*H04J 11/00* (2006.01)
(52) U.S. Cl. .................. 370/208; 370/210; 370/329
(58) Field of Classification Search .......... 370/210, 370/208, 319–321, 329, 335, 339, 341, 342, 370/344; 375/260
See application file for complete search history.

(56) References Cited

U.S. PATENT DOCUMENTS

| | | | |
|---|---|---|---|
| 6,529,951 B1* | 3/2003 | Okuyama et al. | 709/223 |
| 6,898,204 B2* | 5/2005 | Trachewsky et al. | 370/445 |
| 6,901,112 B2* | 5/2005 | McCorkle et al. | 375/259 |
| 7,010,056 B1* | 3/2006 | McCorkle et al. | 375/295 |
| 7,058,414 B1* | 6/2006 | Rofheart et al. | 455/456.4 |
| 2003/0202794 A1* | 10/2003 | Izadpanah et al. | 398/115 |
| 2003/0202801 A1* | 10/2003 | Izadpanah | 398/200 |
| 2006/0193372 A1* | 8/2006 | McCorkle et al. | 375/130 |

* cited by examiner

*Primary Examiner*—Ian N Moore
(74) *Attorney, Agent, or Firm*—Ronald O. Neerings; Wade James Brady, III; Frederick J. Telecky, Jr.

(57) ABSTRACT

System and method for a multi-carrier ultra-wideband (UWB) transmitter. A preferred embodiment comprises an UWB transmitter (for example, transmitter 300) taking advantage of both code division multiple access (CDMA) (for example, block 305) and orthogonal frequency division multiplexing (OFDM) (for example, block 315) techniques to create a multi-carrier UWB transmitter. The multi-carrier UWB is capable of avoiding interferers by eliminating signal transmissions in the frequency bands occupied by the interferers. An alternate embodiment using intermediate frequencies and mixers is also presented.

29 Claims, 8 Drawing Sheets

MULTI-CARRIER TRANSMITTER FOR ULTRA-WIDEBAND (UWB) SYSTEMS

This application claims the benefit of U.S. Provisional Application No. 60/395,379, filed on Jul. 12, 2002, entitled "Multi Carrier Transmission for Ultra Wide Band (UWB) Systems", which application is hereby incorporated herein by reference.

TECHNICAL FIELD

The present invention relates generally to a system and method for wireless digital communications systems, and more particularly to a system and method for providing a wireless communications system with a large data bandwidth.

BACKGROUND

Ultra-wideband (UWB) communications systems are normally defined as carrier-less communications systems wherein the bandwidth of the signal being transmitted, $f_B$, is greater than or equal to 0.20 $f_c$, where $f_c$ is the center frequency of the signal being transmitted and has a minimum bandwidth of 500 MHz. Note that this definition is specified by the Federal Communications Commission of the United States. Narrowband communications systems will have a signal bandwidth to center frequency ratio significantly less than that. For example, IEEE 802.11b, a popular narrowband communications system that transmits in the 2.4 GHz ISM (Industrial, Scientific, and Medical) band, has a signal bandwidth of less than 25 MHz. In other words, IEEE 802.11b's signal bandwidth, $f_B$, is on the order of 0.01 $f_c$.

UWB communications systems have been around for a great number of years, and the majority of them fall under one particular classification, they modulate a stream of short-duration pulses (with an approximate duration of 0.2 nanoseconds (ns)), either in time (pulse position modulation (PPM)), amplitude (pulse amplitude modulation (PAM)), or phase angle (bi-phase modulation). While the existing UWB communications systems can achieve reasonably good performance under ideal conditions, the systems also have significant disadvantages.

The Federal Communications Commission (FCC) of the United States has recently approved the use of UWB communications systems in the US in a report and order entitled "In the matter of Revision of Part 15 of the Commission's Rules, Regarding Ultra-Wideband Transmission System, ET Docket 98-153", adopted Feb. 14, 2002, released Apr. 22, 2002. The document is herein incorporated by reference. The report and order requires that UWB systems used in communications systems operate in the 3.1 to 10.6 GHz frequency band and are limited to indoor use or in hand-held devices that can be employed in activities such as peer-to-peer activities. The FCC also specifies a maximum transmit power for the UWB communications systems.

The FCC did not restrict the UWB communications systems to using short duration pulse streams. Rather, it specified a spectral mask that describes the spectrum of the UWB communications system. The transmit signal of the UWB communications systems must comply to the spectral mask in order to be permitted for sale and use in the US. Since the FCC did not require that UWB communications systems use short duration pulse streams, designers of future UWB communications systems are free to explore other technologies.

One disadvantage of the UWB communications systems that use short duration pulse streams is that in typical indoor applications (a preferred operating environment for UWB communications systems due to their limited transmit power), the normal time delay spread is on the order of 25 nanoseconds (ns). For a pulse-width duration of approximately 0.2 ns, the time delay spread implies that a rake receiver with approximately 125 rake fingers may be required to collect all of the energy from the delay spread. A rake receiver of this high complexity will result in a relatively expensive receiver.

A second disadvantage of the UWB communications systems using short duration pulse streams is that in the presence of other wireless systems, such as the IEEE 802.11a wireless local area network (WLAN) operating in the 5.8 GHz UN-II (Unified National Information Infrastructure) band, the existing UWB communications systems emissions add to the overall noise floor of the WLAN system, thus degrading its performance. The amount of degradation depends upon the separation between the WLAN and UWB communications systems, but may typically range from a 5 to 10 dB degradation of the WLAN communications system performance when the two are in close proximity.

A third disadvantage of the UWB communications systems using short duration pulse streams is that in the presence of relatively narrow band communications systems, such as the WLAN communications system or radar systems, the existing UWB communications signal faces a significant amount of interference. Even with the very wide bandwidths available in the existing UWB communications systems, it may suffer serious performance degradations depending upon the power of the narrow band communications systems and the separation between the two.

A fourth disadvantage of the UWB communications systems using short duration pulse streams is their relative inflexibility when it comes to operating frequencies. The permitted operating frequency for UWB communications systems vary around the world. A permitted frequency range in one country may not be permitted in another. Therefore, the existing UWB communications system's relative inflexibility in terms of operating frequency can result in a communications system that cannot readily adapt to different regulatory restrictions. This can lead to the requirement of the development of a large range of receiver and transmitter circuitry, resulting in escalated device costs.

SUMMARY OF THE INVENTION

These and other problems are generally solved or circumvented, and technical advantages are generally achieved, by preferred embodiments of the present invention which provide an UWB transmitter that is able to operate in an environment with narrowband communications systems without suffering a significant amount of performance degradation and causing a significant amount of performance degradation. Additionally, the UWB transmitter generally has a heretofore unprecedented level of flexibility in its transmission bandwidth and its transmission frequencies.

In accordance with a preferred embodiment of the present invention, a method for providing ultra-wideband wireless communications comprising arranging a data stream into a plurality of sub-frequency ranges, wherein the sub-frequency ranges are portions of a total available transmission bandwidth, transforming the arranged data into a time domain signal, converting the time domain signal into an analog signal, and transmitting the analog signal.

In accordance with another preferred embodiment of the present invention, an ultra-wideband transmitter comprising a data input, a data partitioner coupled to the data input, the data partitioner containing circuitry to partition a data stream provided by the data input into a plurality of units and to place the units into individual sub-frequency ranges, a digital-to-analog converter (DAC) coupled to the data partitioner, the DAC containing circuitry to convert a digital data stream into an analog signal stream, and an antenna coupled to the DAC, the antenna used to transmit the analog signal stream.

In accordance with another preferred embodiment of the present invention, a method for avoiding interferers comprising scanning a transmit band for interferers, determining the presence of interferers, zeroing out data in a signal in a frequency band containing the interferers, and transmitting the signal.

An advantage of a preferred embodiment of the present invention is that the data bandwidth and the transmission frequencies can be easily changed via software to meet operating and regulatory restrictions. Therefore a single UWB transmitter can be designed and optimized for operation throughout the world. This results in a lower cost, yet better performing transmitter.

A further advantage of a preferred embodiment of the present invention is that upon detection of an interferer, the transmission frequency range can be dynamically modified to avoid transmissions in the same frequency range of the interferer, allowing the transmitter to maintain a good error rate while only suffering a small reduction in overall transmission bandwidth. This may result in a better overall performance due to a reduction in the number of retransmissions due to damage inflicted by the interferer.

Yet another advantage of a preferred embodiment of the present invention is that due to the structure of the transmission, wherein the transmit duration of the individual transmission units is of greater duration than the expected delay spread, there is no inter-symbol interference (ISI) or frequency selectivity at the receiver. Therefore, the transmitter will result in the simplification of the design of the receiver.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a UWB transmitter using code-division multiple access (CDMA) in combination with orthogonal frequency division multiplexing (OFDM) to create a multi-carrier UWB communications system that operates within the FCC restricted 3.1 to 10.6 GHz frequency band, with a built-in measure of spectral agility to avoid interferers and to minimize the interference that it creates with respect to other communications systems. Note that while the FCC restricts the use of UWB communications system to using the 3.1 to 10.6 GHz frequency band, any given UWB communications system is free to use a subset of that frequency band and is not required to use the entire band, should it not be deemed necessary, as long as it meets the definitions for an UWB communications system discussed previously. The invention may also be applied, however, to other UWB transmitters that are operating in other frequency bands, as well as in other regulatory restrictions.

Figure 1:
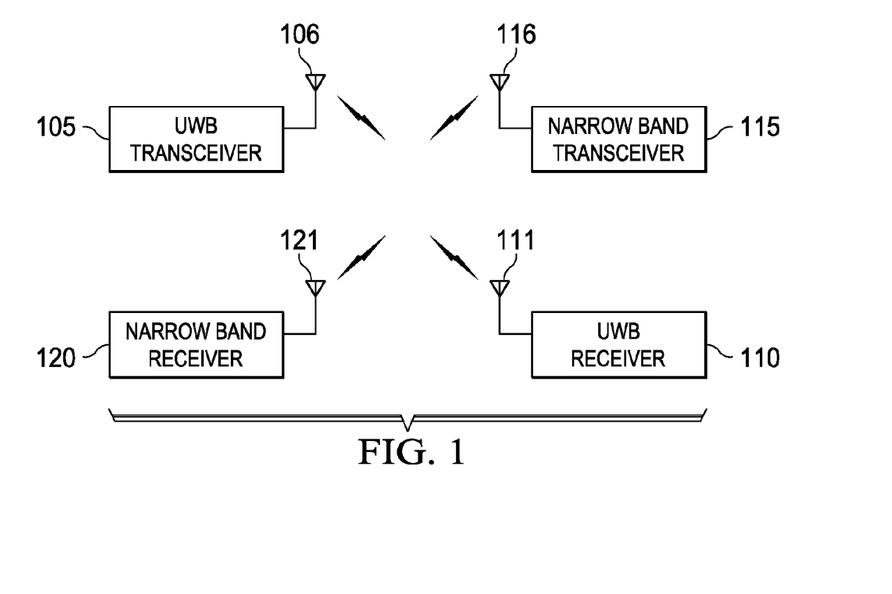
FIG. 1 is a block diagram illustrating a situation where an ultra-wideband (UWB) wireless communications network is operating in close proximity with a narrowband wireless communications network.

With reference now to FIG. 1, there is shown an exemplary operating environment with two different wireless communications systems, a first wireless communications system is an UWB communications system made up of an UWB transmitter 105 and an UWB receiver 110, and a second wireless communications system is a narrowband communications system made up of a narrowband transmitter 115 and a narrowband receiver 120. Note that while the first and second wireless communications systems are illustrated with a single receiver, there can be (and typically there are) more than one receiver in a single wireless communications system.

It is possible for multiple wireless communications systems to operate within close vicinity of one another if the systems transmit using different portions of the frequency spectrum, e.g., the different systems use different frequency bands, or if the different systems use data encoding that makes the transmissions "invisible" to the other systems, i.e., the transmissions are orthogonal to one another. Alternatively, if one system transmits at an extremely low power level, it is possible that its signal will have little or no effect on the transmission of the other system. However, the system transmitting with low signal power may be severely affected by the system transmitting with high signal power if the two systems are operating in close proximity.

Figure 2A:
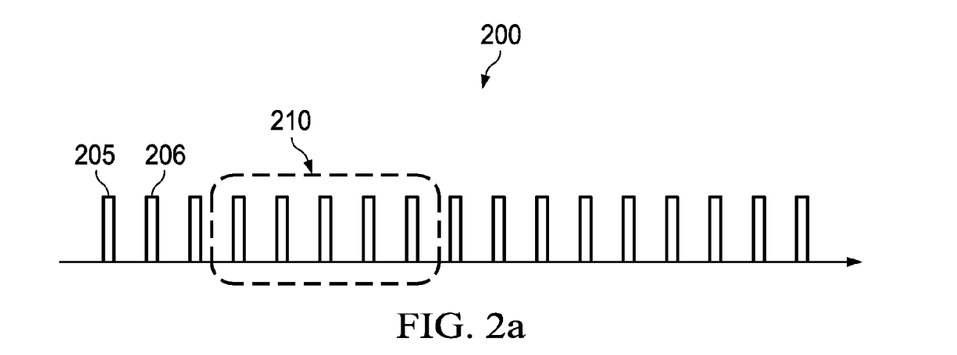
FIGS. 2a-d are diagrams illustrating a stream of short-duration pulses and different modulation techniques for same.

With reference now to FIG. 2a, there is shown an exemplary pulse stream 200, wherein the pulses are of short duration. The exemplary pulse stream 200 may be an output of an UWB transmitter that is part of an UWB communications system. The exemplary pulse stream 200 is made up of a series of short duration pulses, for example, pulses 205 and 206. Prior to being modulated, the pulses 205 and 206 are essentially identical (or as close to being identical as possible). A group of pulses 210 is highlighted to illustrate several commonly used modulation techniques. Note that although the pulses, for example, pulses 205 and 206, are illustrated as being essentially square in shape, in practice, pulses of a variety of different shapes, for example, Gaussian pulses, may actually be preferred over the square pulses due to difficulties in generating square pulses.

Figure 2B:
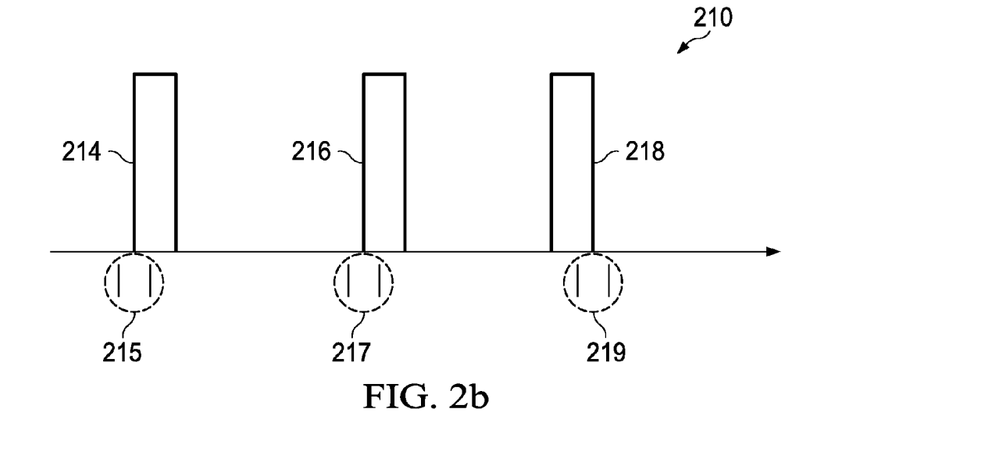

With reference now to FIG. 2b, there is shown the group of pulses 210, wherein the pulses are modulated using pulse position modulation (PPM). PPM varies the position of the pulses in order to encode the data. For example, three pulses 214, 216, and 218 can be used to illustrate PPM. The first pulse 214 appears slightly delayed of where it is expected to appear, as indicated by highlight 215. The second pulse 216 is slightly delayed and appears a small amount of time after when it was expected to appear, as shown by highlight 217. Finally, the third pulse 218 is slightly advanced and appears a small amount of time prior to when it was expected to appear, as shown by highlight 217. PPM uses either the advanced or delayed appearance of a pulse with respect to its expected appearance to convey data.

Figure 2C:
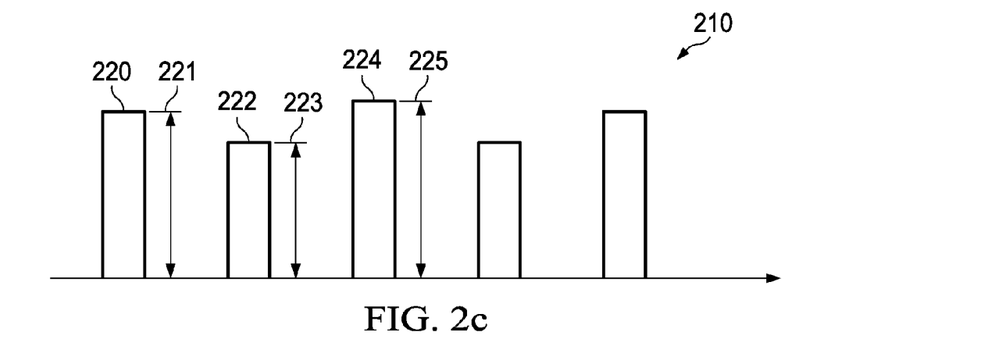

With reference now to FIG. 2c, there is shown the group of pulses 210, wherein the pulses are modulated using pulse amplitude modulation (PAM). PAM varies the amplitudes of the pulses to encode the data while leaving the positions of the pulses untouched. For example, pulses 220, 222, and 224 all vary in amplitude from one another, as indicated by markers 221, 223, and 225.

Figure 2D:
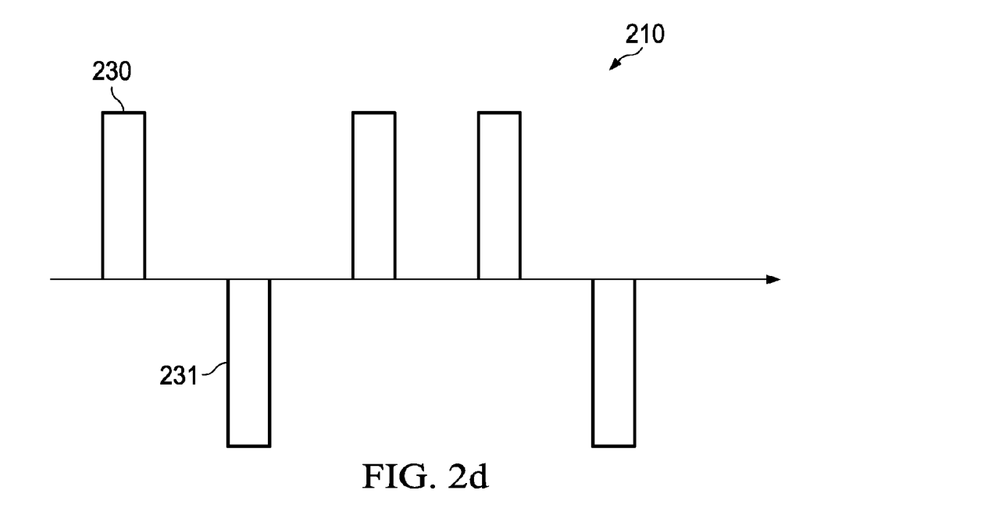

With reference now to FIG. 2d, there is shown the group of pulses 210, wherein the pulses are modulated using bi-phase modulation. FIG. 2d illustrates a case where the phase is varied one of two ways, zero (0) degrees or 180 degrees. For example, a first pulse 230 is at zero degrees, while a second pulse 231 is at 180 degrees.

FIGS. 2a-2d illustrated a short duration pulse stream and several different modulation techniques that can be used to modulate data onto the pulse stream. The use of short duration pulse streams is the most often used way to create an UWB transmitter. However, it is not the only way. As discussed above, generally the definition for an UWB transmitter is simply that the bandwidth of the signal being transmitted, $f_B$, is greater than or equal to 0.20 $f_c$, where $f_c$ is the center frequency of the signal being transmitted and has a minimal bandwidth of 500 MHz. Additionally, the FCC has only required that an UWB transmitter conforms to a specified spectral mask, and not the use of any particular transmission technology. Therefore, UWB transmitters using other transmission technologies can be created.

Figure 3:
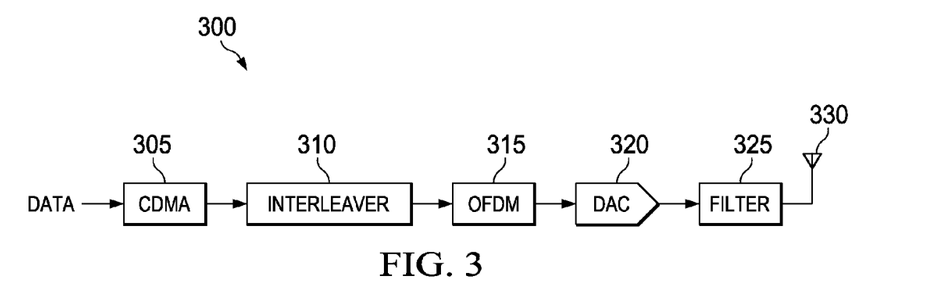
FIG. 3 is a block diagram illustrating a multi-carrier UWB transmitter, wherein the transmitter uses both code-division multiple access (CDMA) and orthogonal frequency division multiplex (OFDM) techniques, according to a preferred embodiment of the present invention.

With reference now to FIG. 3, there is shown an UWB transmitter 300 that is a multi-carrier transmitter and makes use of code-division multiple access (CDMA) and orthogonal frequency division multiplexing (OFDM) techniques to provide a transmitter that is flexible in terms of its data rate and tolerance to interference according to a preferred embodiment of the present invention. Note that FIG. 3 illustrates only the portion of the UWB transmitter 300 that is responsible for the encoding and modulating of the data to be transmitted. Other portions of a transmitter, such as the control logic and glue logic are omitted to simplify the illustration.

The UWB transmitter 300 can be partitioned into several different functional blocks: a CDMA block 305, an interleaver 310, an OFDM block 315, a digital-to-analog converter (DAC) 320, and a filter 325. The CDMA block 305 takes as input, a data stream (digital in form) and applies a spreading code to the data stream. The spreading code is used to take the data stream and encode it in such a way that the data stream consumes a large amount of spectrum than it normally would, to help increase its tolerance to interference. After spreading, the individual units of the spread data stream are referred to as chips. A commonly used spreading code in CDMA systems is known as a Walsh code.

Figure 4:
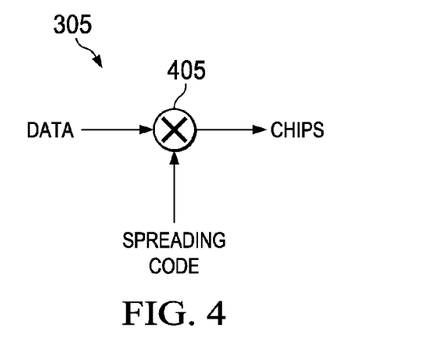
FIG. 4 is a block diagram presenting a closer view of a CDMA block illustrated in FIG. 3, according to a preferred embodiment of the present invention.

With reference now to FIG. 4, there is shown an implementation of the CDMA block 305 according to a preferred embodiment of the present invention. The CDMA block 305 takes as input a data stream. The data stream is made up of data bits, denoted b(i). The data stream is then provided to a multiplier 405. The multiplier 405 has two inputs, a first input is the data stream and a second input is the spreading code, denoted c(j). According to a preferred embodiment of the present invention, the multiplier 405 takes I consecutive data bits, b(i), {i=1, 2, . . . , I} and multiplies the I data bits with a spreading code, c(j). The value of I depends upon (and is a function of) the length of an inverse Fourier transform that is used in the OFDM block 315, which will be discussed below. There is an overall spreading gain J, Therefore a single bit of data is spread into J chips. The output of the multiplier 405 is a set of chips, denoted d(k), {k=1, 2, . . . , I*J}, that may be expressed as: d(k)=b(i)c(j); {k=1, 2, . . . , I*J} and the relationship between k and i and j can be expressed as: k=(i−1)*J+j.

The inclusion of the CDMA block 305 in the UWB transmitter 300 provides a great amount of additional flexibility to the communications system. The use of spreading codes permits the use of several different UWB transmitters within a small local area without the transmissions between the different transmitters interfering with one another. For example, different piconets can be setup to operate within a single office building and each piconet can use a different UWB transmitter, which in turn, is using a different set of spreading codes. If the spreading codes are chosen correctly, there will be no interference and the piconets will be able to safely cohabitate. Piconets and the use of different spreading codes to ensure safe cohabitation are well known by those of ordinary skill in the art of the present invention.

With reference now back to FIG. 3, after being spread, the spread data stream is provided to the interleaver 310. The function of the interleaver 310 is to collect the spread data stream into portions, denoted $g^j(i)$. The purpose of the interleaver 310 is to increase the tolerance of the system to interference by reducing the probability that interference will damage adjacent chips, thereby increasing the probability that any built-in error correction can correct damaged chips. However, rather than simply partitioning the spread data stream into individual portions and hence leaving adjacent chips next to one another, the interleaver 310 takes every J-th chip (where J is defined as the interleaving ratio of the interleaver 310) and combines them into J portions. For example, let d(k) represent the spread data stream, then the interleaver 310 would collect the chips into a portion j, expressible as: $g^j(i) = \{d(j), d(j+J), d(j+2J), \ldots, d(j+(i-1)*J), \ldots, d(j+(I-1)*J)\} = c(j)*\{b(1), b(2), \ldots, b(i), \ldots, b(I)\}$. For simplicity, $g(i)$ will denote $g^j(i)$.

The interleaver 310 also converts the real data ($g(i)$ above) into complex symbols. The complex symbols is expressible as: $\tilde{g}(\tilde{i}) = g(2\tilde{i}) + j*g(2\tilde{i}-1); \tilde{i}=1, 2, 3, \ldots, I/2$. Note that $\tilde{g}(-\tilde{i}) = \tilde{g}^*(\tilde{i}); \tilde{i}=1, 2, 3, \ldots, I/2$. Therefore, $\tilde{g}(l)$ is defined for $l=\{-I/2, \ldots, 0, \ldots, I/2\}$.

After being interleaved, the interleaved and spread data stream is provided to the OFDM block 315. The OFDM block 315 takes the interleaved and spread data stream and prepares the data for transmission by adjusting a signal gain at various frequencies within the transmission band to adjust for any frequency sensitivity in a transmit antenna 330, fits the data stream to any required spectral restrictions (such as excluded frequency ranges or detected interferers at certain frequencies, etc.), converts the interleaved and spread data stream into its time domain representation, and creates a cyclic prefix for the data (to make the transmission resistant to inter-symbol interference (ISI)).

Figure 5:
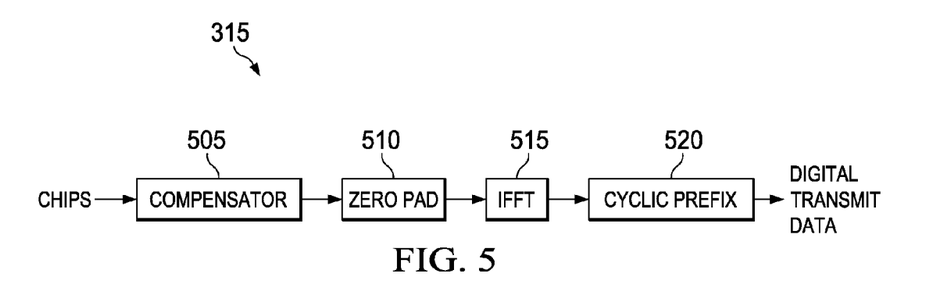
FIG. 5 is a block diagram presenting a closer view of an OFDM block illustrated in FIG. 3, according to a preferred embodiment of the present invention.

With reference now to FIG. 5, there is shown an implementation of the OFDM block 315 according to a preferred embodiment of the present invention. The OFDM block 315 takes as input the interleaved and spread data stream and provides it to a compensator 505. The compensator 505 is used to adjust the amplitudes of the interleaved and spread data stream at various frequencies to take care of any antenna differentiation. The compensation is achieved by multiplying the data, $\tilde{g}(l)$, with appropriate compensation values, $\alpha(l)$. The values for $\alpha(l)$ can be pre-calculated (perhaps during a calibration or initialization step) and stored in the compensator 505.

Generally, compensation is required because it is highly unlikely that for the entire transmission frequency band, the transmit antenna 330 would be able to produce the same transmit power. The compensator 505 adjusts the amplitudes of the interleaved and spread data stream so that the output of the transmit antenna 330 is essential ly flat (equal in power) over the entire transmit frequency band. The compensated data stream can be expressed as: $\hat{g}(l) = \tilde{g}(l)*\alpha(l); l=\{-I/2, \ldots, 0, I/2\}$. Given a flat transmission output, an UWB receiver is then expected to receive a flat signal, with any channel attenuation ignored.

After amplitude compensation in the compensator 505, the data is then zero padded in the zero pad unit 510. The zero pad unit 510 zeroes out certain frequency bands to conform to the FCC mandated spectral mask. Additionally, if the presence of an interferer is detected at a certain frequencies, then those frequency bands would also be zeroed by the zero pad unit 510. For example, the FCC prohibits transmissions in the frequency bands lower than 3.1 GHz. Therefore, if for illustration purposes N/2=38, then the compensated signal, H(m), can be expressed as:

$H(m) = \hat{g}(m - N/2); m = \{N/2, N/2+1, \ldots, I/2+N/2\}$ $H(m) = 0; m = \{-N/2, -N/2+1, -N/2+2, \ldots, N/2\}$ $H(m) = \hat{g}(-m+N/2); m = \{-N/2, -N/2-1, \ldots, -I/2-N/2\}$ Note that the FCC also prohibits transmission above 10.6 GHz. However, as an alternative to zeroing out frequencies above 10.6 GHz, a filter can be used to eliminate signal components greater than 10.6 GHz.

Figure 6:
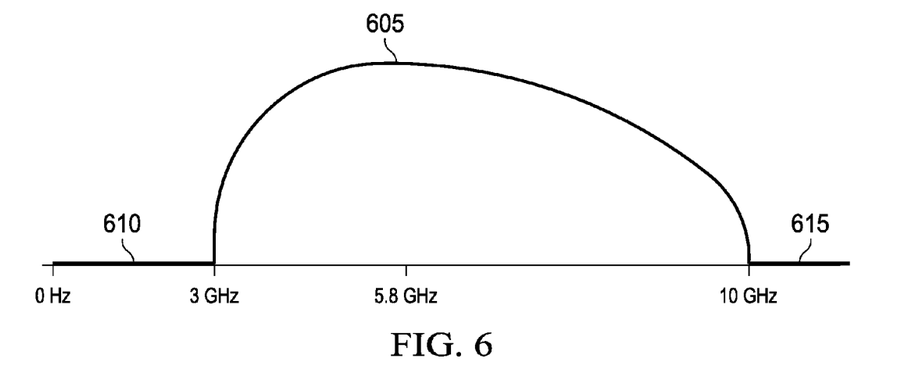
FIG. 6 is a data plot illustrating a partial frequency domain view of a transmit signal of a multi-carrier UWB transmitter, according to a preferred embodiment of the present invention.

With reference now to FIG. 6, there is shown a plot of a frequency domain view of the data at the output of the zero pad unit (for example, the zero pad unit 510 (FIG. 5)) according to a preferred embodiment of the present invention. Note that the plot only displays a view of the data from zero hertz (DC) to approximately 10 GHz, with the data being displayed as a curve 605. As discussed above, the zero pad unit 510 zeroes out any part of the data that is outside of the allowed transmit frequency range. Since the FCC permits ultra-wideband transmissions (for communications purposes) only in the frequency range of 3.1 GHz to 10.6 GHz, all portions of the data below 3.1 GHz are zeroed out (displayed as a heavy line 610) and data above 10.6 GHz is also zeroed out (displayed as a heavy line 615). As discussed above, anything above 10.6 GHz can also be eliminated using a low-pass filter rather than zeroing out the data. The actual method used is a design choice, however, the use of zeroing out data above 10.6 GHz may still require the use of a low-pass filter to ensure that the transmitted signal conforms to spectral restrictions.

With reference back now to FIG. 5, after compensation, the compensated signal, H(m), is converted into its time domain representation by an inverse Discrete Fourier Transform (iDFT) in the IFFT unit 515. There are many possible implementations of the iDFT, of which, the Inverse Fast Fourier Transform is one particular implementation. The IFFT unit 515 converts the compensated signal, H(m), which is in the frequency domain into a time domain signal, h(m). The time domain signal, h(m), can be expressed as:

$$h(m) = \frac{1}{2\pi} \sum_{n=-(I+N)/2}^{(I+N)/2} H(n) e^{\frac{j*2\pi*m*n}{(I+N)}}.$$

After being converted into a time domain signal, h(m), the data stream is provided to a cyclic prefix unit 520, where a cyclic prefix is appended to the time domain signal. The cyclic prefix unit 510 duplicates several symbols of h(m) and appends them to h(m). After the cyclic prefix has been appended to h(m) forming a composite signal, $\lambda$(m), the composite signal is replicated several times.

Figure 7:
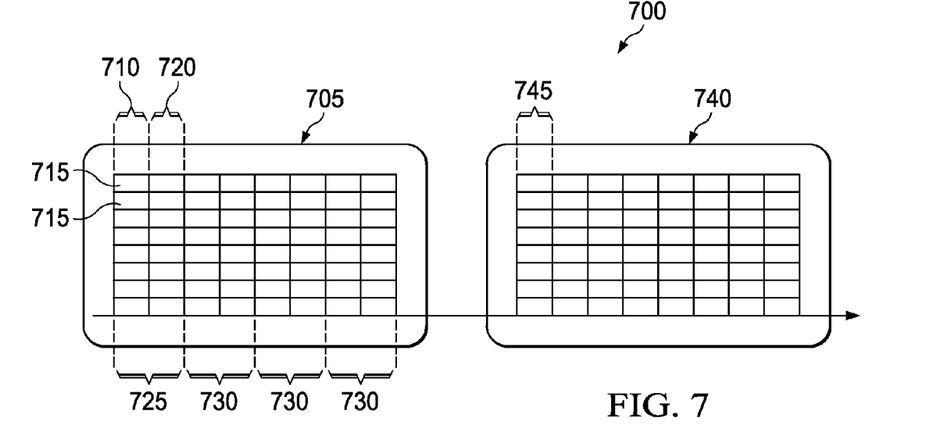
FIG. 7 is a block diagram presenting a detailed view of a structure of a time-domain transmitted signal of a multi-carrier UWB transmitter, according to a preferred embodiment of the present invention.

With reference now to FIG. 7, there is shown a time domain view of a digital version of an exemplary transmitted signal for the UWB transmitter 300 (FIG. 3) according to a preferred embodiment of the present invention. FIG. 7 displays two symbols of an exemplary transmitted signal for the UWB transmitter 300 (FIG. 3) prior to it being converted into an analog signal by the DAC 320, e.g., the symbols displayed in FIG. 7 are examples of the output of the OFDM block 315. Taking a detailed view of a first symbol 705, the first symbol 705 is made up of several different parts. A first part is an actual OFDM symbol 710. The OFDM symbol 710 is what would be output from the IFFT 515 (FIG. 5). The OFDM symbol 710 is, in turn, made up of a series of data blocks, each located at a different frequency range 715 (each rectangle represents a single frequency range). The individual frequency ranges are commonly referred to as a tone. For example, in an exemplary 10 GHz data bandwidth UWB system with 512 individual frequency ranges (tones), then each tone would represent a contiguous frequency range of 40 MHz (2*10 GHz/512).

The OFDM symbol 705 is then duplicated to form a cyclic prefix 720 that is appended to the OFDM symbol 705 to form a composite symbol 725. The composite symbol 725 is then replicated several times (replicated symbols 730) to form the complete first symbol 705. The number of times that composite symbol 725 is replicated is dependent upon the desired size of the symbol, the desired data rate, etc. As displayed in FIG. 7, the first symbol 705 is made up of the composite symbol 725 and three replications of the composite symbol 725, for a total of four (4) copies of the composite symbol. For example, if the OFDM symbol 710 was 512 bits in length, then the composite symbol 725 (and each of its duplicates 730) would be 1024 bits in length and the first symbol 705 would be 1024*4=4096 bits in length. The first symbol 705 as displayed in FIG. 7 is what would be found at the output of the cyclic prefix unit 520 (FIG. 5).

Should other data rates be desired, the parameters such as the number of zero padding tones, the number of data bits per symbol, IFFT length, etc. may be varied. The table below shows the various parameters for several other data rates. Note that Example 1 (the second column of numbers in the table below) is used as an example in the discussion above.

filter 325 is to ensure that the transmitted signal fits within the specified spectral mask as specified by the FCC (and other regulatory bodies). The filter 325 may be a static filter with pre-specified frequency cutoffs and roll off rates or it may be a configurable filter that can be modified to meet the UWB transmitter's operating environment. For example, if the UWB transmitter 300 detects that it is operating in the presence of an interferer, perhaps an IEEE 802.11a wireless network, the filter 325 can be configured to attenuate the UWB transmitter's output signal in the 5.8 GHz UNII band (where the IEEE 802.11a wireless network operates). That said, the filter's main function is to ensure that the data fits within the spectral mask specified by the FCC (or other regulatory bodies). After filtering, the data is transmitted via the antenna 330. The antenna 330 is preferably a broadband antenna in order to fully cover the entire operating frequency of the UWB transmitter 300.

Figure 8:
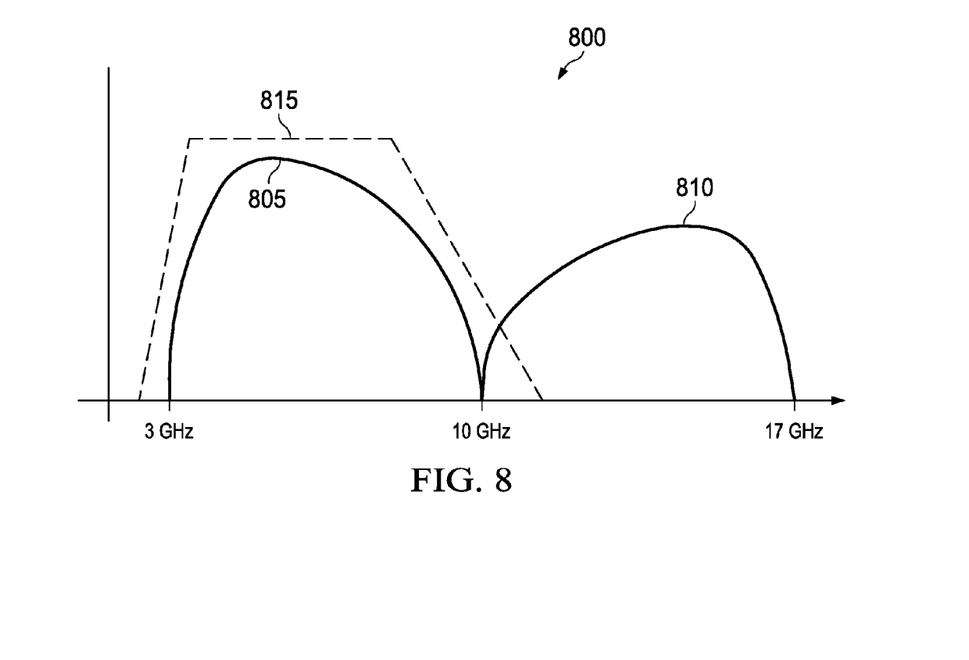
FIG. 8 is a data plot illustrating a partial frequency domain view of a transmit signal of a multi-carrier UWB transmitter with a frequency response of a filter used to ensure that the transmit signal meets spectral restrictions, according to a preferred embodiment of the present invention.

With reference now to FIG. 8, there is shown a partial plot 800 of a frequency domain view of a transmitted signal for the UWB transmitter 300 (FIG. 3) according to a preferred embodiment of the present invention. Note that the plot 800 is not a complete frequency domain view of the transmitted signal in that the frequency components for negative frequency ranges are not displayed, nor are any components above 17 GHz displayed. The plot 800 displays a main lobe 805 located between 3 GHz and 10 GHz and a secondary lobe 810 between 10 GHz and 17 GHz. The secondary lobe 810 is an aliased version of the main lobe 805. The plot 800 also displays a desired frequency response 815 of a band-pass

|  | Ex 1 | Ex 2 | Ex 3 | Ex 4 | Ex 5 | Ex 6 |
| --- | --- | --- | --- | --- | --- | --- |
| Data rate | 100 Mbps | 100 Mbps | 500 Mbps | 500 Mbps | 2 Gbps | 5 Gbps |
| Delay spread tolerance | 25 ns | 25 ns | 25 ns | 25 ns | 6 ns | 2 ns |
| Parameters of IFFT | 512 | 1024 | 512 | 512 | 128 | 64 |
| Data bits I | 350 | 700 | 350 | 350 | 90 | 40 |
| Spreading gain J | 5 | 5 | 5 | 3 | 1 | 1 |
| Zero padding tones N | 162 | 324 | 162 | 162 | 38 | 24 |
| Upsampling for IFFT | 1 | 1 | 1 | 1 | 1 | 1 |
| Bin width of IFFT | 40 MHz | 20 MHz | 40 MHz | 40 MHz | 156 MHz | 312 MHz |
| OFDM symbol length | 25.6 ns | 102.4 ns | 25.6 ns | 25.6 ns | 6.4 ns | 3.2 ns |
| OFDM symbol repetition | 8 | 8 | 2 | 4 | 6 | None, 1 cyclic prefix |
| Total OFDM length after repetition | 204.8 ns | 0.8192 µs | 51.2 ns | 102.4 ns | 38.4 ns | 5.2 ns |
| Inter OFDM symbol separation | 700 ns | 2.048 µs | 140 ns | 230 ns | 45 ns | 8 ns |

With reference now back to FIG. 3, after processing by the OFDM block 315, the data is ready to be transmitted after it is converted into an analog signal by the DAC 320. According to a preferred embodiment of the present invention, a DAC with a resolution of two (2) to three (3) bits is sufficient to accurately convert the digital signal into an analog signal. The DAC 320 should also be able to operate at a frequency that is at least twice the maximum frequency in the transmitted signal.

After being converted into an analog signal by the DAC 320, the data is filtered by the filter 325. The purpose of the filter. The band-pass filter is used to conform the transmitted signal to the FCC spectral mask and to eliminate as much of the aliased signal as possible.

The multi-carrier UWB transmitter as described in FIGS. 3 through 8 may be described as a baseband transmitter. This means that the data that is being processed for transmission will be transmitted without being mixed onto a different carrier frequency. There are many transmitters that generates the data and signal that is to be transmitted at a frequency range that is lower (or different) from the final frequency range in which the signal is to be transmitted. These types of transmitters are known as intermediate frequency (IF) transmitters. The use of an IF transmitter involves the use of a mixer in the transmitter to bring the signal to be transmitted up to the final transmit frequency. An advantage of IF transmitters is that the processing of the signal to be transmitted can occur at lower frequencies. This can be an advantage, especially for digital circuits since they can operate at lower frequencies and consume less power.

Figure 9:
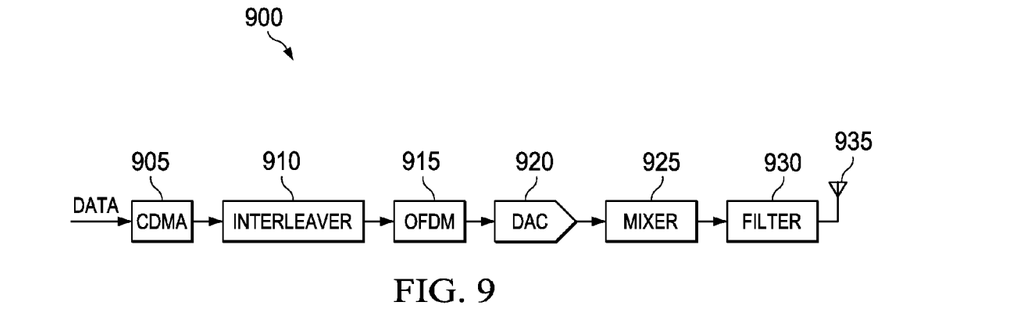
FIG. 9 is a block diagram illustrating a multi-carrier intermediate frequency (IF) UWB transmitter, according to a preferred embodiment of the present invention.

With reference now to FIG. 9, there is shown a block diagram of an IF multi-carrier UWB transmitter 900 according to a preferred embodiment of the present invention. Note that the IF multi-carrier UWB transmitter 900 has many components that are identical to the multi-carrier UWB transmitter 300 (FIG. 3) discussed previously. In fact, the major substantive difference between the IF multi-carrier UWB transmitter 900 and the multi-carrier UWB transmitter 300 (FIG. 3) is the presence of a mixer 925. The mixer 925 is located after a digital-to-analog converter (DAC) 920 and prior to a filter 930. The input into the mixer 925 is multiplied by a carrier frequency (not shown) that brings the signal to be transmitted up into the desired frequency range.

For example, in a FCC legal UWB transmitter, the transmitted signal can have a total frequency footprint of approximately seven and one-half (7.5) GHz (10.6–3.1 GHz=7.5 GHz). Therefore, in the IF multi-carrier UWB transmitter 900, the signal can be processed at an IF of approximately 3.75 GHz and when the signal is ready to be transmitted, it can be mixed up to the carrier frequency of 7.35 GHz (the center frequency of the frequency range).

In addition to processing of the signal to be transmitted at an intermediate frequency, the signal can also be partitioned into smaller frequency ranges that may be processed separately. Once the processing is complete, the individual signals can be mixed into the appropriate frequency ranges and then transmitted. An advantage inherent in working with signals at lower frequencies is that the processing does not have to operate at as high a frequency, enabling the use of slower (lower spec) components, hence saving money and power. This is especially advantageous because the processing on the signal is performed by digital circuitry, where higher operating frequencies lead to greater power consumption.

Figure 10A:
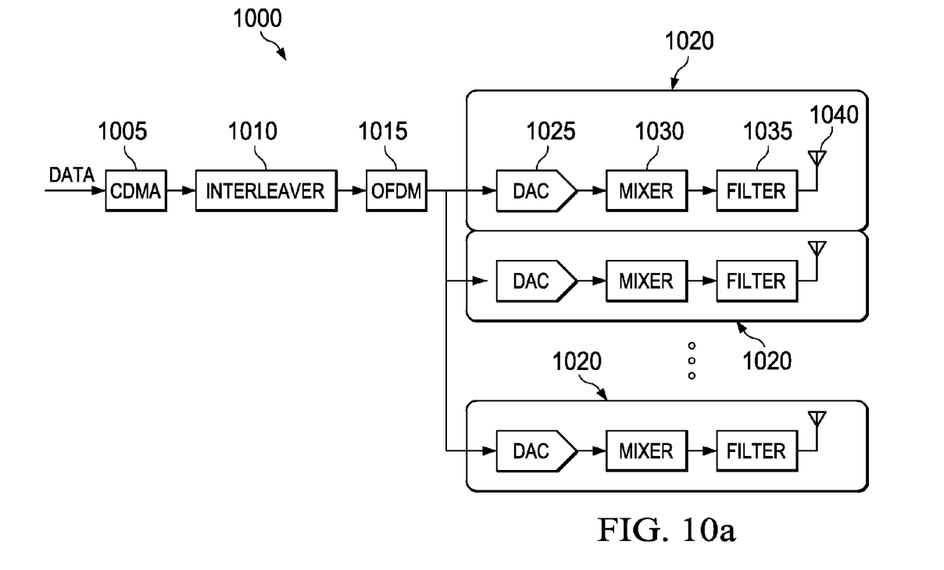
FIGS. 10a and 10b are block diagrams illustrating other multi-carrier IF UWB transmitters, according to preferred embodiments of the present invention.

With reference now to FIG. 10a, there is shown a block diagram of an IF UWB transmitter 1000 wherein the signal to be transmitted is processed in small frequency ranges and then mixed into higher frequencies by a plurality of mixers according to a preferred embodiment of the present invention. The IF UWB transmitter 1000 is similar to the IF UWB transmitter 900 (FIG. 9) in that it processes the signal to be transmitted at an intermediate frequency that is different from the final transmit frequency and uses mixers to bring the signal from the intermediate frequency to the final transmit frequency.

However, rather than processing the signal to be transmitted as a whole, the signal is partitioned into a plurality of smaller frequency ranges. For example, for the 7.5 GHz UWB frequency range permitted by the FCC, the IF UWB transmitter 1000 may partition the 7.5 GHz frequency range into three 2.5 GHz frequency ranges. Note that the transmit frequency range is partitioned into three only as an example and the actual number of partitions may be different, depending on the implementation of the IF UWB transmitter 1000. The IF UWB transmitter 1000 creates the signal in a fashion that is similar to the way that the UWB transmitter 900 (FIG. 9), but in the smaller frequency range. After the signal for each frequency range is complete (by an OFDM unit 1015), each portion of the signal is provided to an independent analog section 1020 for conversion into an analog signal, mixing to the final transmit frequency, filtering, and then transmission. Note that there is an independent analog section for each partition.

Each independent analog section 1020 includes a DAC 1025, a mixer 1030, a filter 1035, and an UWB antenna 1040. The DAC 1025 and UWB antenna 1040 in each independent analog section may be identical. However, the mixer 1030 in each independent analog section uses a different carrier frequency, since it has to mix its particular frequency range to a different portion of the transmit spectrum. The filter 1035 may be different for each independent analog section, depending on the dimensions and requirements of each portion of the transmit signal. Once each portion of the transmit signal has been filtered and is ready for transmission, each independent analog section can transmit because each uses a different portion of the transmit frequency range and no interference exists between the independent analog sections.

According to another preferred embodiment of the present invention, the independent analog sections can share a single UWB antenna (not shown) rather than having one UWB antenna per independent section. The use of a single UWB antenna (not shown) can result in an overall reduction in the hardware requirements.

Figure 10B:
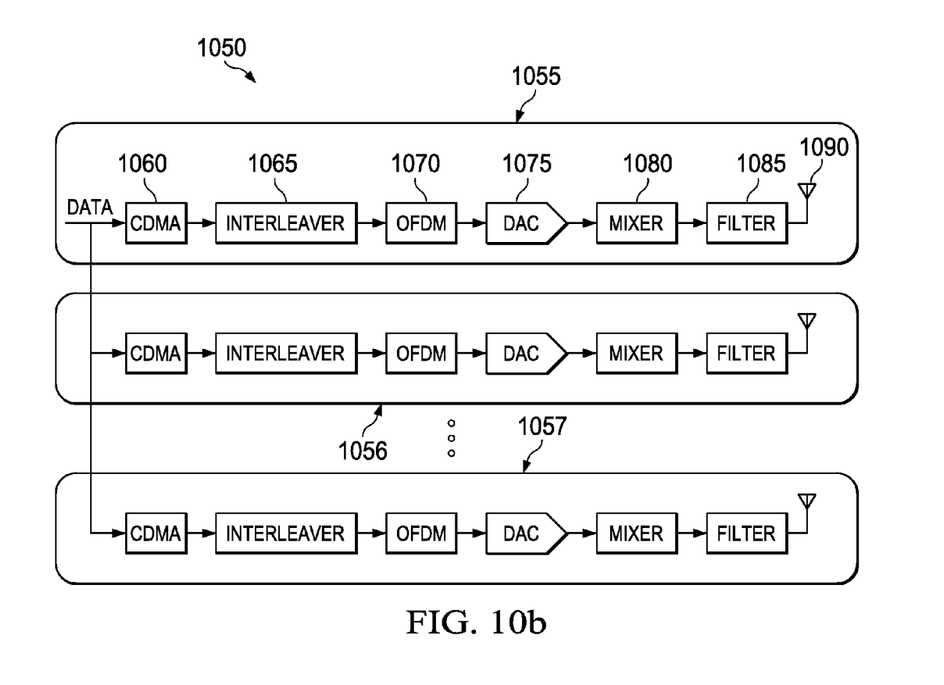

With reference now to FIG. 10b, there is shown a diagram illustrating of an IF UWB transmitter 1050 with a plurality of data streams that are independently processed and mixed by a plurality of independent CDMA, OFDM, and mixers, according to a preferred embodiment of the present invention. As opposed to the IF UWB transmitter 1000 (FIG. 10a), the IF UWB transmitter 1050 has a plurality of data streams that are independently processed by independent signal processing units (CDMA and OFDM) and then mixed up to independent carrier frequencies by independent mixers. Each of the independent signal processing units and mixers can be thought of as being an IF UWB transmitter in and of itself. For example, an independent signal processing unit and mixer (ISPM) 1055 includes all of the functional units of an IF UWB transmitter, for example, the IF UWB transmitter 900 (FIG. 9), including a CDMA unit 1060, an interleaver 1065, an OFDM unit 1070, a DAC 1075, a mixer 1080, a filter 1085, and an antenna 1090 (optional).

As displayed in FIG. 10b, the IF UWB transmitter 1050 has at least three ISPM 1055, 1056, and 1057. Each ISPM 1055, 1056, and 1057 has a data input that is coupled to a single data input for the IF UWB transmitter 1050. Each ISPM would receive an independent portion of the overall data input, which it would then process and mix to a specified carrier frequency. For example, the ISPM 1055 would receive one portion of the overall data input, it would then process its portion of the data input using its CDMA unit 1060, interleaver 1065, and OFDM unit 1070. After the signal processing, the ISPM 1055 would mix the encoded data stream to the specified carrier frequency. According to a preferred embodiment of the present invention, each ISPM would not have its own individual antenna (as displayed in FIG. 10b). Rather, the output of each ISPM's filter would be sent to a single antenna (not shown) and then transmitted from the single antenna (not shown).

Figure 11:
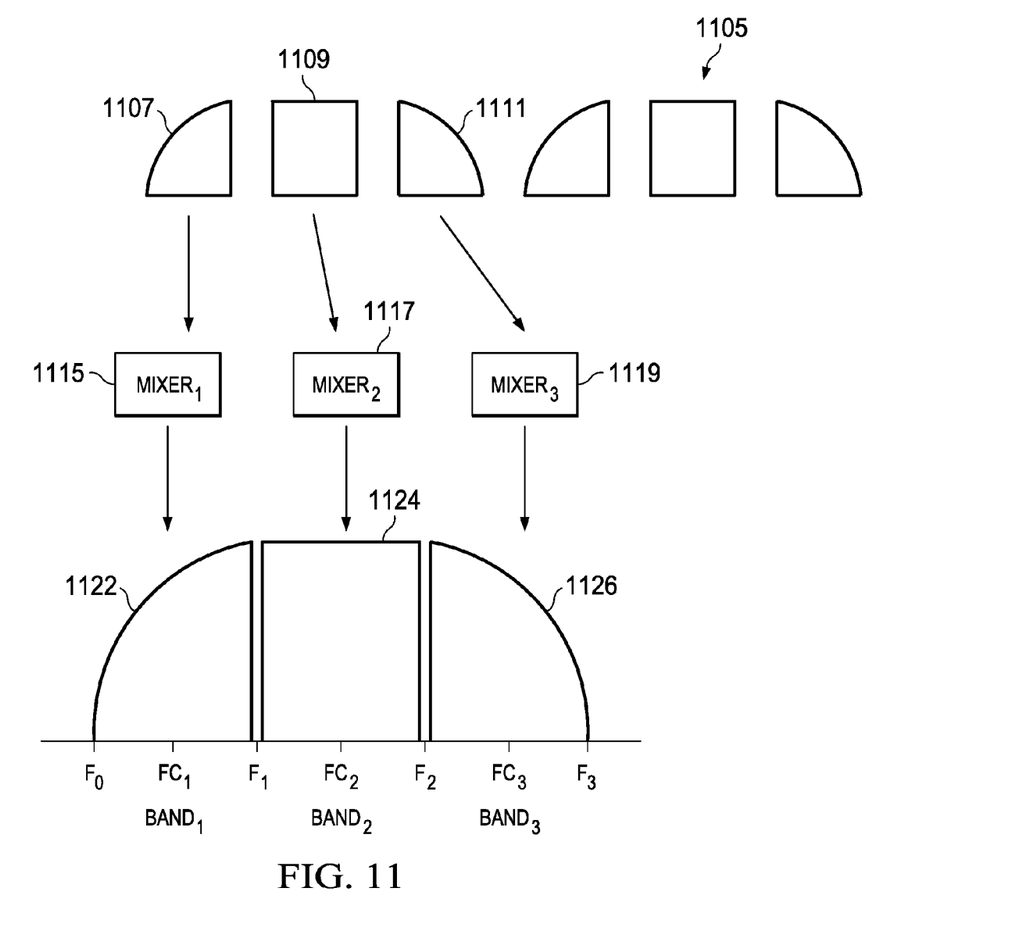
FIG. 11 is a diagram illustrating the operation of the multi-carrier IF UWB transmitter illustrated in FIG. 10a, according to a preferred embodiment of the present invention.

With reference now to FIG. 11, there is shown a diagram illustrating the operation of an IF UWB transmitter (for example, the IF UWB transmitter 1000 (FIG. 10a)) wherein the IF UWB transmitter features a plurality of mixers and partitions the signal to be transmitted into a plurality of smaller frequency ranges according to a preferred embodiment of the present invention. FIG. 11 displays a sequence of OFDM symbols 1105 that could be the output of an OFDM unit, such as the OFDM unit 1015 (FIG. 10a). According to a preferred embodiment of the present invention, the IF UWB transmitter 1000 would produce a sequence of OFDM symbols (such as OFDM symbols 1107, 1109, and 1111) in frequency order, meaning that the IF UWB transmitter 1000 would simply generate OFDM symbols for each of the plurality of smaller frequency ranges in increasing (or decreasing) frequency order. Once it has reached the end of the transmit frequency range, it will simply return to the beginning of the transmit frequency range and begin again. For example, OFDM symbol 1107 may be the lowest frequency range of three smaller frequency ranges, while OFDM symbol 1109 is the next lowest and OFDM symbol 1111 is the highest.

The individual OFDM symbols, as they are generated by the OFDM unit 1015 (FIG. 10a) are provided to a corresponding DAC (not shown) and then a mixer (for example, mixers 1115, 1117, or 1119) which mixes the analog OFDM symbol into a proper transmit frequency. For example, FIG. 11 illustrates that OFDM symbol 1107 is provided to a mixer 1115 which mixes the OFDM symbol 1107 with a carrier frequency, $FC_1$, which is the center frequency of frequency band, $BAND_1$, with a frequency spread from $F_0$ to $F_1$. Subsequent OFDM symbols, such as OFDM symbols 1109 and 1111 are mixed by mixers 1117 and 1119 respectively.

As discussed previously, wireless communications networks operating in unlicensed frequency bands have to contend with interference, whether the interference is from noise sources or from other wireless communications networks. A major potential source of interference for an UWB communications network is an IEEE 802.11a wireless network. IEEE 802.11a wireless networks are narrowband networks operating in the 5.8 GHz UNII band. Being narrowband networks, the transmit signal of the IEEE 802.11a wireless network can be significantly stronger than the transmit signal of the UWB wireless network, and this is so dictated by governmental regulations. As such, any portion of the UWB transmission in the 5.8 GHz UNII band will likely be corrupted if the UWB wireless communications network is operating in close proximity to an IEEE 802.11a wireless network.

There are several commonly used solutions to the problem of interference. One solution is to encode sufficient redundancy into the transmission so that the transmitted data can be recovered if the interference is below a certain threshold. This solution can significantly reduce system data transfer rates due to the required redundancy. Another solution is to increase transmit power to mitigate the effects of the interferer. This is often not possible due to the governmental regulations. Yet another solution involves the technique of simply not transmitting in the frequency band where the interference is expected to occur. This solution can waste available transmission bandwidth if the interferer is not present and the available bandwidth is not used.

Figure 12:
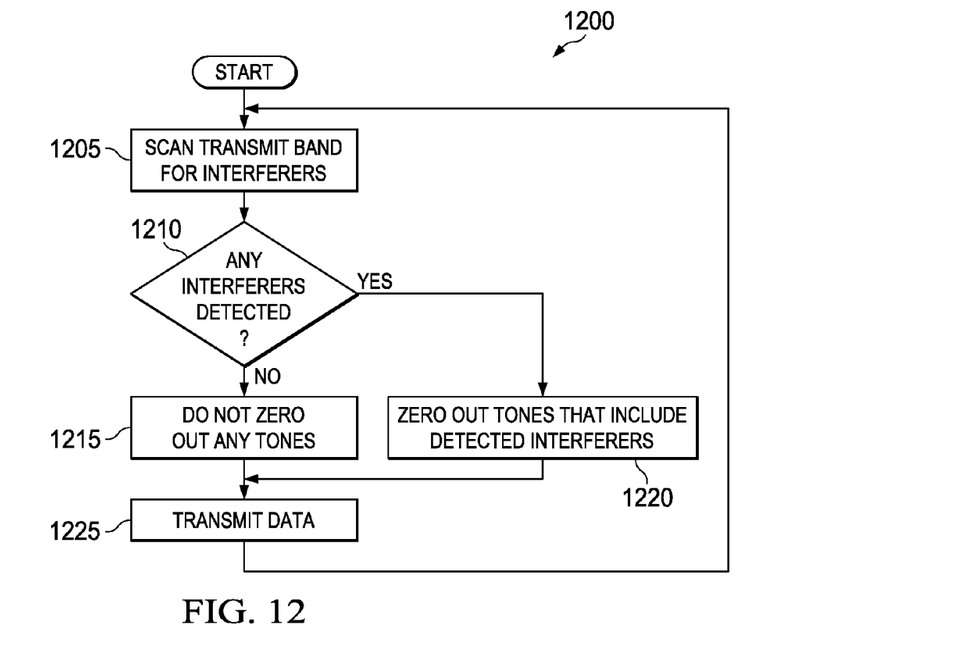
FIG. 12 is a flow diagram illustrating an algorithm for detecting the presence of interferers and avoiding the detected interferers while using a multi-carrier UWB transmitter, according to a preferred embodiment of the present invention.

With reference now to FIG. 12, there is shown a flow diagram illustrating an algorithm 1200 for the active detection and avoidance of interferers to a multi-carrier UWB communications system according to a preferred embodiment of the present invention. According to a preferred embodiment of the present invention, the algorithm 1200 would execute in a processing element (not shown) of a multi-carrier UWB transmitter, such as the multi-carrier UWB transmitter 300 (FIG. 3). The algorithm 1200 could be configured to execute after the multi-carrier UWB transmitter is powered-up or after each time it is reset (or re-initialized). Alternatively, the algorithm 1200 can be configured to execute periodically during normal operation. Additionally, the algorithm 1200 may be configured to execute when the processing element of the multi-carrier UWB transmitter detects a reduction in the overall data transfer rate of the UWB communications system, which can indicate the presence of an interferer. In yet another alternative, the algorithm 1200 may be configured to execute when the UWB communications system detects that a measurable error rate exceeds a specified threshold. Examples of measurable error rates include (but are not limited to) bit error rate (BER), packet error rate (PER), and frame error rate (FER).

The algorithm 1200 begins by scanning the entire transmit band for the presence of any interferers (block 1205). According to a preferred embodiment of the present invention, an interferer may be defined as any signal with a magnitude that exceeds some specified threshold residing within the transmit band of the multi-carrier UWB transmitter. It is often required that transmissions by the multi-carrier UWB transmitter be stopped while the scan takes place, so it is preferred that the scans do not occur with a great regularity.

After the scan is complete, the results are examined to determine if any interferers exist within the transmit band (block 1210). If no interferers were detected, then the transmissions may continue with no modifications required (block 1215). However, if the presence of an interferer(s) was detected, then the multi-carrier UWB transmitter avoids the use of the frequency ranges occupied by the interferer(s) (block 1220). The avoidance of the occupied frequency ranges can be achieved by zeroing out the data. This is performed in a zero pad unit, such as the zero pad unit 510 (FIG. 5). Alternatively, the occupied frequency ranges can be eliminated via the use of a programmable filter. However, the use of the programmable filter to eliminate data can result in a distortion of portions of the data that is not affected by the interferers due to the non-ideal behavior of the pass, stop, and transition bands of the programmable filter. There is an additional advantage that is realized by zeroing out the data, which is no data is lost since the UWB transmitter can place the data that was zeroed out in a next available frequency range.

Once the data is ready for transmission (with or without portions eliminated due to interference), the data is transmitted (block 1225). Since the interferers may be dynamic, periodically (or randomly) appearing and then disappearing, the algorithm 1200 may be configured to execute periodically to optimize the usage of the available transmit bandwidth. This is done by returning to block 1205 and rescanning the transmit band for interferers. However, as stated above, the algorithm 1200 should not be executed too often since the execution of the algorithm 1200 also has an effect on the ability of the multi-carrier UWB transmitter to transmit data.

Figure 13:
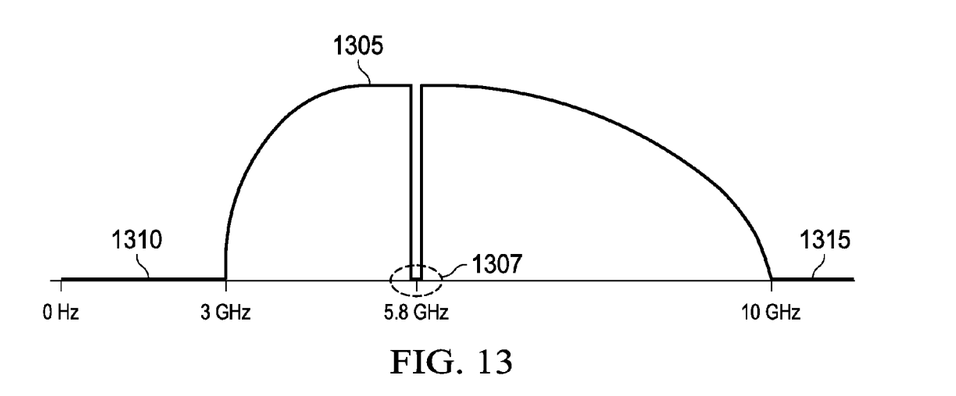
FIG. 13 is a data plot illustrating how the transmitted signal is modified to avoid the detected interferers, according to a preferred embodiment of the present invention.

With reference now to FIG. 13, there is shown a frequency domain plot of an exemplary signal from a multi-carrier UWB transmitter wherein a portion of the signal has been eliminated due to the detection of an interferer according to a preferred embodiment of the present invention. For discussion purposes, assume that an interferer was detected in the 5.8 GHz UNII band. Perhaps the interferer is an IEEE 802.11a wireless communications network. In order to avoid loss of information transmitted in that frequency band, the multi-carrier UWB transmitter chooses to not transmit any information in that frequency band. It does so by zeroing out any data in that band, prior to the creation of the OFDM symbols. The eliminated data is shown as a portion of the signal being set to zero (highlight 1307). By zeroing out only the portion of the data that is affected by the interferer, the remainder of the data (shown as the curve 1305) remains intact. Should a programmable filter have been used rather than zeroing out the data, it would not have been possible to provide such a sharp transition between the retained data and the eliminated data. It should be noted that since the UWB transmitter knows of the interferer prior to transmitting data and that it zeroes out (or filters) portions of the transmit signal frequency range, no actual data is lost. The net effect of the zeroing out (or filtering) is that the overall data rate of the UWB transmitter drops. Ideally, the UWB transmitter can even stop all transmissions until the interferer goes away.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing ultra-wideband wireless communications comprising:
    arranging ultra-wideband data stream into a plurality of tones, each tone comprising a sub-frequency range, wherein the sub-frequency ranges are portions of a total available transmission bandwidth;
    adjusting a signal magnitude by a compensator for each of the plurality of sub-frequency ranges to compensate for a transmit antenna's frequency selectivity with a gain that is different for each sub-frequency range;
    transforming the arranged data into a time domain signal;
    converting the time domain signal into an analog signal; and
    transmitting the analog signal.

2. The method of claim 1 further comprising multiplying a data stream with an orthogonal spreading code prior to arranging.

3. The method of claim 2, further comprising interleaving the multiplied data stream, wherein an interleaving factor is equal to a spreading gain of the orthogonal spreading code.

4. The method of claim 2, wherein the multiplying comprises:
    selecting I data bits from the data stream, where I is a number that is specified and is dependent upon an inverse Discrete Fourier transform;
    multiplying the I data bits with J orthogonal spreading codes, where J is the spreading gain; and
    producing a total of I*J chips.

5. The method of claim 1 further comprising inserting special values into certain sub-frequency ranges of the plurality of sub-frequency ranges to ensure that the wireless communications adhere to spectral constraints.

6. The method of claim 5, wherein the special values are equal to zero.

7. The method of claim 1, wherein the transforming is an inverse Discrete Fourier transform implemented as an inverse Fast Fourier transform (iFFT), and wherein the iFFT has a length that is a power of two.

8. The method of claim 1 further comprising appending a cyclic preamble to the computed data prior to converting.

9. The method of claim 8, wherein the appending comprises:
    duplicating a result of the transforming;
    concatenating the result of the transforming with the duplicated result; and
    replicating the concatenated result a number of times.

10. The method of claim 1, further comprising filtering the analog signal to ensure that the analog signal complies with spectral restrictions.

11. The method of claim 1, further comprising mixing the analog signal up to a desired transmission frequency prior to transmitting.

12. The method of claim 1, wherein the data stream is partitioned into a plurality of independent partitions, and wherein each partition undergoes converting and transmitting independently of each other.

13. The method of claim 1, wherein the data stream is partitioned into a plurality of independent partitions, and wherein each partition undergoes arranging, transforming, converting, and transmitting independently of each other.

14. A method for providing ultra-wideband wireless communications comprising:
    arranging ultra-wideband data stream into a plurality of tones, each tone comprising a sub-frequency range, wherein the sub-frequency ranges are portions of a total available transmission bandwidth;
    partitioning the data stream by a data partitioner into I portions, where I is a number of data bits taken from the data stream and multiplied with the orthogonal spreading code;
    placing the I partitions into I sub-frequency ranges out of a total of I+N sub-frequency ranges, where N is a number of zero pad sub-frequency ranges;
    putting a special value into the N remaining sub-frequency ranges;
    transforming the arranged data into a time domain signal;
    converting the time domain signal into an analog signal; and
    transmitting the analog signal.

15. An ultra-wideband transmitter comprising:
    a data input;
    a data spreader having an input coupled to the data input and an output coupled to the data partitioner, the data spreader containing circuitry to multiply the data stream with an orthogonal spreading code;
    an interleaver having an input coupled to the data spreader and an output coupled to the data partitioner, the interleaver containing circuitry to collect every data tone from the output of the data spreader and place it into one of J storage locations, wherein J is an order of the interleaver;
    a data partitioner coupled to the data input, the data partitioner containing circuitry to partition a data stream provided by the data input into a plurality of tones comprising respective individual sub-frequency ranges;
    a digital-to-analog converter (DAC) coupled to the data partitioner, the DAC containing circuitry to convert a digital data stream into an analog signal stream; and
    an antenna coupled to the DAC, the antenna used to transmit the analog signal stream.

16. The ultra-wideband transmitter of claim 15, wherein there is a plurality of ultra-wideband transmitters operating within a local area, and wherein the data spreader in each of the ultra-wideband transmitters uses a different orthogonal spreading code.

17. The ultra-wideband transmitter of claim 15, wherein a data tone, n, is placed into storage location n modulo J.

18. The ultra-wideband transmitter of claim 15 further comprising a mixer unit having an input coupled to an output of the DAC, the mixer unit containing circuitry to modulate the analog signal stream to a desired carrier frequency.

19. The ultra-wideband transmitter of claim 15 further comprising a filter having an input coupled to the DAC and an output coupled to the antenna, the filter to ensure that the analog signal stream meets spectral restrictions.

20. The ultra-wideband transmitter of claim 15, wherein there are a plurality of DACs coupled to the data partitioner, wherein each DAC is further coupled to a mixer unit, wherein each DAC contains circuitry to convert a portion of the digital data stream into a portion of the analog signal stream, and wherein each mixer unit contains circuitry to modulate the portion of the analog signal stream to a different desired carrier frequency.

21. The ultra-wideband transmitter of claim 20, wherein, the plurality of individual analog signal streams can be combined to recreate the analog signal stream.

22. The ultra-wideband transmitter of claim 20, wherein each mixer unit has an output coupled to a filter, the filter to ensure that the portion of the analog signal stream meets spectral restrictions.

23. The ultra-wideband transmitter of claim 22, wherein each filter has an output coupled to an individual antenna.

24. The ultra-wideband transmitter of claim 15, wherein there are a plurality of data partitioners coupled to the data input wherein there is a DAC coupled to each data partitioner, wherein the data stream is partitioned into a plurality of independent partitions, and wherein each independent partition is provided to a different partitioner and DAC.

25. The ultra-wideband transmitter of claim 24, wherein each DAC is coupled to the antenna.

26. An ultra-wideband transmitter comprising:
a data input;
a data partitioner coupled to the data input, the data partitioner containing circuitry to partition a data stream provided by the data input into a plurality of tones comprising respective individual sub-frequency ranges;
a compensator having an input coupled to a data spreader, the compensator containing circuitry to adjust a signal gain in each of the individual sub-frequency ranges;
a zero pad unit having an input coupled to an output of the compensator, the zero pad unit containing circuitry to append zero valued sub-frequency ranges to the output of the compensator;
an inverse Discrete Fourier transform unit having an input coupled to an output of the zero pad unit, the inverse Fourier transform unit containing circuitry to convert the output of the zero pad unit into a time domain representation;
a digital-to-analog converter (DAC) coupled to the data partitioner, the DAC containing circuitry to convert a digital data stream, into an analog signal stream; and
an antenna coupled to the DAC, the antenna used to transmit the analog signal stream.

27. The ultra-wideband transmitter of claim 26, wherein the inverse Discrete Fourier transform unit implements an inverse Fast Fourier Transform (iFFT) algorithm with a length equal to a power of two.

28. The ultra-wideband transmitter of claim 27, wherein the zero pad unit appends a sufficient number of zero valued sub-frequency ranges to make the sum of the individual sub-frequency ranges and the zero valued sub-frequency ranges equal to the length of the iFFT.

29. The ultra-wideband transmitter of claim 26, wherein the data partitioner further comprises a cyclic prefix unit having an input coupled to an output of the inverse Fourier transform unit, the cyclic prefix unit containing circuitry to duplicate the output of the inverse Fourier transform unit, append the output of the inverse Fourier transform unit with the duplicate, and replicate copies of the appended output.

* * * * *